Aug. 21, 1934.   H. H. PEPPERCORN   1,971,234
METHOD OF OBTAINING STEREOSCOPIC CINEMATOGRAPHIC EFFECTS
Filed July 2, 1931
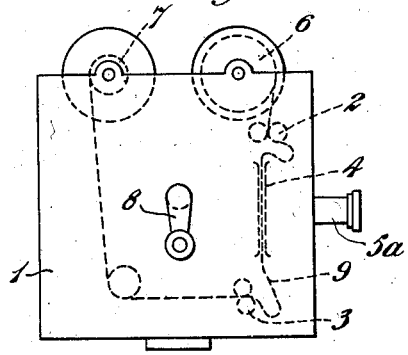
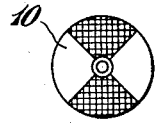
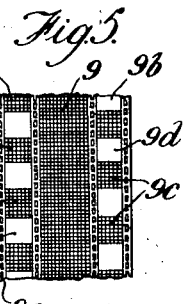
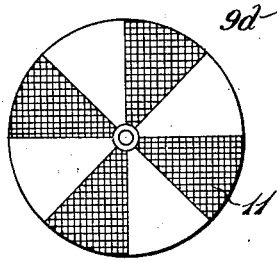
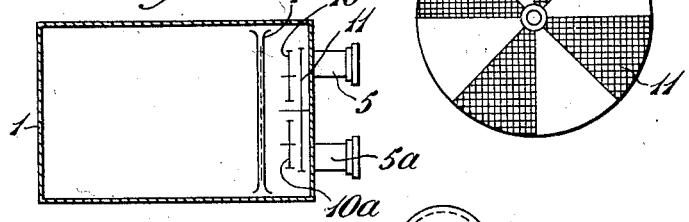
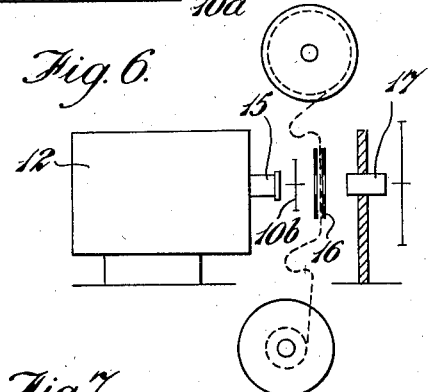
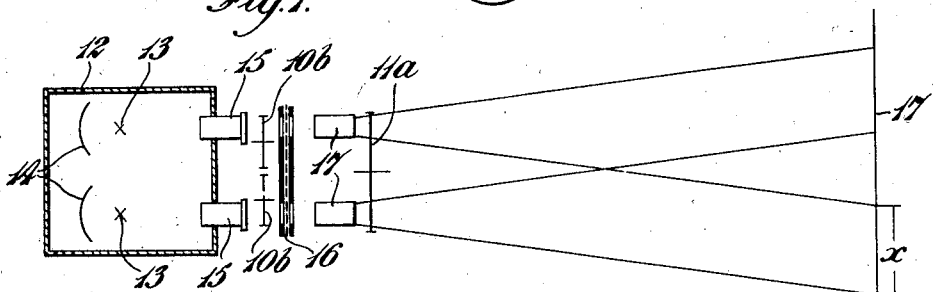
Inventor
H. H. Peppercorn Patented Aug. 21, 1934

1,971,234

UNITED STATES PATENT OFFICE 1,971,234

METHOD OF OBTAINING STEREOSCOPIC CINEMATOGRAPHIC EFFECTS

Herbert Howe Peppercorn, Downe, England

Application July 2, 1931, Serial No. 548,403
In Great Britain March 18, 1931

2 Claims. (Cl. 88—16.6)

This invention relates to a method of and means for obtaining stereoscopic cinematographic effects without the necessary use of image selecting devices, synchronized shutters or the like in front of or associated with the eyes of the observer, of the kind in which left and right hand cinematographic pictures are taken alternately by means of a cinematographic camera fitted with a pair of lenses spaced apart so that the distance between their axes approximates to the normal ocular distance, and wherein a corresponding positive film or films is or are produced from the negative film or films so taken, the positive left and right hand pictures being projected alternately by means of projection apparatus having objective lenses arranged with their axes also at the ocular distance apart, that is to say between 2½ and 3 inches.

In the previous proposals of this kind for obtaining stereoscopic cinematographic effects, alternate left and right hand pictures are projected on to approximately the same picture space on the screen. Furthermore, in stereoscopic cinematographic projection in which means is provided for alternately interrupting the vision of the observer's eyes, it has been proposed to project the right and left hand pictures alternately on the screen so that their centre lines are not coincident on the screen.

According to the present invention in a method of the kind referred to for obtaining stereoscopic cinematographic effects, the positive left and right hand pictures are projected alternately by means of projection apparatus having duplicate arcs or other sources of illumination, and having duplicate condenser and objective lenses fixed with parallel axes spaced apart at the normal ocular distance, that is to say between 2½ and 3 inches, the whole projection apparatus being arranged so that the alternate left and right hand pictures are thrown alternately upon the screen with the respective pictures displaced laterally with respect to one another by a distance which is equal to or substantially equal to the distance at which the objective lenses are spaced apart.

The speed of taking and of projection is preferably increased substantially beyond the normal to eliminate the lateral flicker, a suitable speed being sixty-four picture spaces a second. Inasmuch as the blank picture spaces on one film strip are opposite the picture spaces on the other strip, the resultant speed of projection is sixty-four pictures per second. The left and right hand pictures preferably are taken on and projected from a single film of suitably increased width, or if separate film strips of normal width are employed, these are preferably connected together by an intermediate strip of suitable material such as paper, or are synchronized by other suitable means, so as to ensure that the correct sequence and alternation of the left and right hand pictures shall be maintained.

The invention is hereinafter described by way of example with reference to the accompanying diagrammatic drawing, in which:—

Figure 1 is a side elevation illustrating a suitable construction of camera for carrying out the invention;

Figure 2 is a sectional plan view corresponding to Figure 1;

Figures 3 and 4 are views in front elevation of the shutters employed in the camera;

Figure 5 illustrates a portion of the film which is produced;

Figure 6 is a side elevation illustrating the projection apparatus; and

Figure 7 is a plan view corresponding to Figure 6 and showing the manner in which the projected left and right hand images are displaced laterally with respect to one another upon the screen.

In carrying the invention into effect with reference to the accompanying diagrammatic drawing, a cinematographic camera 1 is employed having the usual film feeding devices 2, 3, but having a double gate 4 arranged behind a pair of lenses 5, 5a spaced apart with their axes separated by a distance approximating to the normal ocular distance, that is to say between 2½ and 3 inches. A film feeding spool 6 and a re-winding spool 7 are arranged in suitable chambers, for example across the top of the camera 1, the whole of the mechanism being driven by means of a crank handle 8 in any suitable known manner.

As will be seen in Figure 5 the film 9 is of increased width, the respective left and right hand pictures being taken upon spaced strips 9a, 9b separated by an intermediate portion which serves merely to maintain the two picture-strips in proper relationship. A pair of rotary shutters 10, 10a is provided between the lenses 5, 5a and the gate 4, such shutters being so formed and arranged and driven that in taking, alternate picture spaces 9c in each strip are blank, the blank spaces 9c in each strip being opposite to the picture spaces 9d in the other strip. A shutter 11 or shutters of usual formation is arranged to obstruct the lenses during the shifting of the film. As shown in Figure 5 the film conveniently is formed with four sets of perforations 9e so that it may be used with duplicate feeding sprockets and mechanism of known construction.

The film taken by means of the camera in the manner described, is developed and a corresponding film is printed for projection.

For the purpose of projection a light chamber 12 is employed which is of a width sufficient to accommodate a pair of arcs 13 together with reflectors 14 spaced apart at the normal ocular distance corresponding to the spacing of the lenses in the camera. The condensers 15 are similarly spaced, and the gate 16 is of double width as in the camera. The objective lenses 17 similarly are spaced apart. In the case of the projection apparatus, a pair of shutters 10b are arranged similarly to the shutters 10, 10a in the camera, while the shutter 11a corresponds to the shutter 11 in the camera.

It will be seen that when the composite film shown in Figure 5 is projected by means of the apparatus shown in Figures 6 and 7, the left and right hand pictures are thrown upon the screen 17 alternately, and are displaced on the screen laterally with respect to one another by a distance X which is equal to or substantially equal to the spacing of the respective pairs of lenses. The projection is, of course, carried out at the same or approximately the same speed as the taking.

It will be understood that the invention is not limited to the particular details hereinbefore described. For example, the construction of the camera and the cinematographic apparatus may be modified in various ways without departing from the invention, while in place of using a single film of increased width as shown in Figure 5, separate films of standard width connected by an intermediate strip of any suitable material may be employed in a similar manner, or alternatively the camera and projection apparatus may be used with a pair of entirely separate films which are synchronized with one another in any suitable manner, so that the left and right hand pictures are projected alternately in the same sequence as they were taken.

What I claim is:—

1. The herein described method consisting in taking cinematographic pictures on a film through successive exposures, with the successive pictures spaced apart laterally of the film a distance corresponding with the normal ocular distance and alternating longitudinally of the film, and projecting said pictures alternately with their projected images spaced laterally a distance in correspondence with the normal ocular distance, with the projection period substantially increased with respect to the persistence of vision period.

2. The herein described method consisting in taking cinematographic pictures in two longitudinal series, the distance between the pictures of one series and the pictures of the other series corresponding with the normal ocular distance, the pictures of one series alternating laterally with the pictures of the other series, and projecting both series of said pictures alternately and successively, with the pictures spaced laterally a distance in correspondence with the normal ocular distance and the projection period substantially increased with respect to the persistence of vision period.

HERBERT HOWE PEPPERCORN.